United States Patent [19]
Webster et al.

[11] Patent Number: 5,701,632
[45] Date of Patent: Dec. 30, 1997

[54] DEBRIS BLOWING APPARATUS

[75] Inventors: Craig Webster, Jesmond; John Sadler, Darlington, both of United Kingdom

[73] Assignee: Black & Decker Inc., Newark, Del.

[21] Appl. No.: 711,329

[22] Filed: Sep. 3, 1996

[30] Foreign Application Priority Data

Sep. 4, 1995 [GB] United Kingdom ............... 9517995

[51] Int. Cl.⁶ .................................................. A47L 5/14
[52] U.S. Cl. ........................... 15/330; 15/344; 15/405; 15/409
[58] Field of Search ........................ 15/329, 330, 344, 15/405, 409

[56] References Cited

U.S. PATENT DOCUMENTS

| | | | |
|---|---|---|---|
| 4,615,069 | 10/1986 | Henning | 15/409 X |
| 4,663,799 | 5/1987 | Kiyooka | 15/344 X |
| 4,694,528 | 9/1987 | Comer et al. | 15/330 |
| 5,280,667 | 1/1994 | Coathupe | 15/409 |
| 5,450,649 | 9/1995 | Turnbull | 15/409 X |
| 5,457,848 | 10/1995 | Miwa . | |
| 5,477,585 | 12/1995 | Hentzschel et al. | 15/409 X |

FOREIGN PATENT DOCUMENTS

| | | |
|---|---|---|
| 0599477 | 11/1992 | European Pat. Off. . |
| 2300535 | 9/1976 | France . |
| 2583825 | 12/1986 | France . |
| 4425863 | 3/1995 | Germany . |

*Primary Examiner*—Chris K. Moore
*Attorney, Agent, or Firm*—Charles E. Yocum; Dennis A. Dearing; Kerry H. Owens

[57] ABSTRACT

A debris blowing apparatus with a motor, a fan driven by the motor, an inlet to the fan and an air outlet from the fan. A portion of the air which is emitted through the outlet is recycled through a metering aperture into the air inlet to maintain a constant load on fan whilst varying the air output.

6 Claims, 4 Drawing Sheets

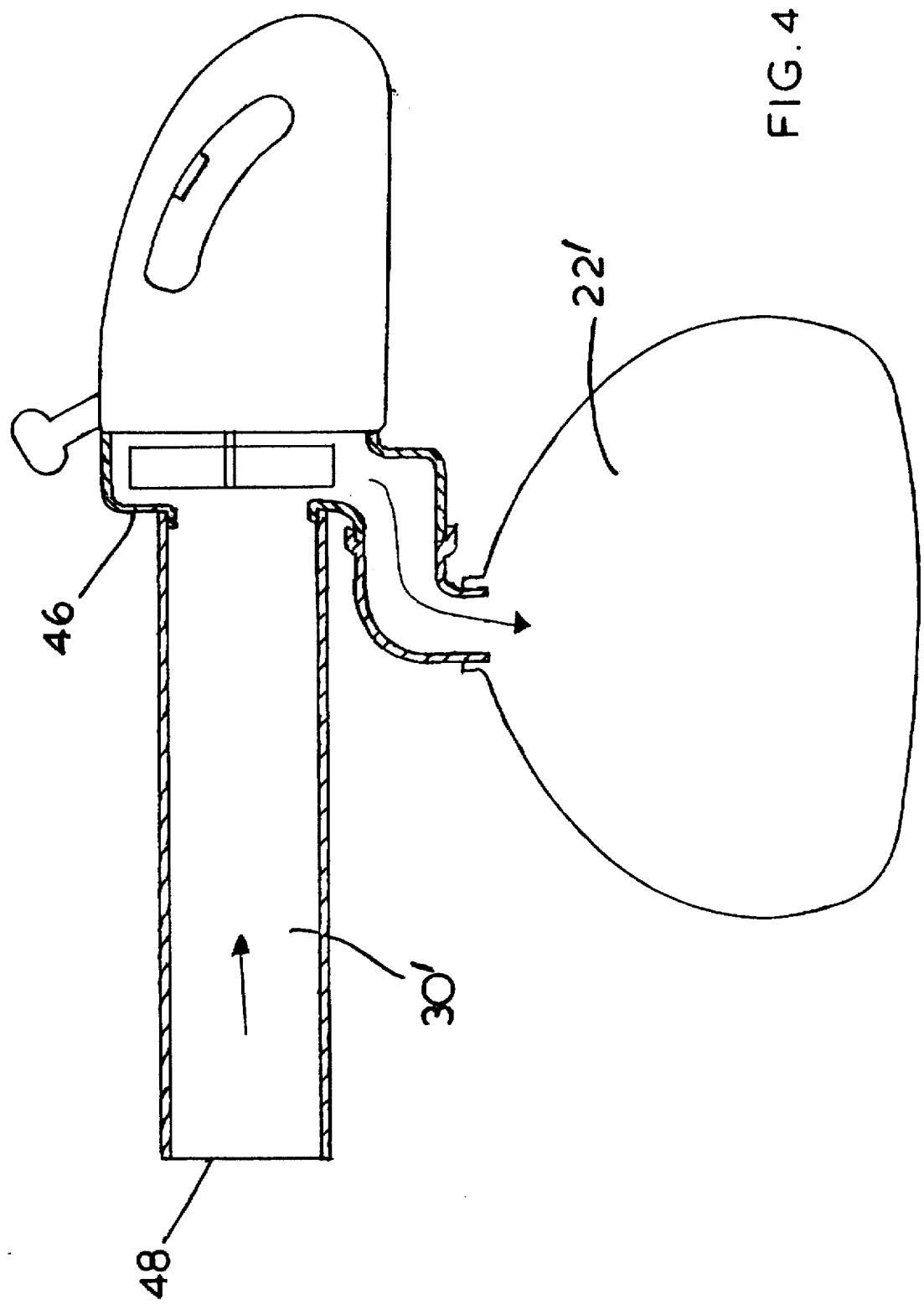

DEBRIS BLOWING APPARATUS

BACKGROUND OF THE INVENTION

This invention relates to a debris blowing apparatus, in particular a garden debris blowing apparatus used for blowing debris into piles ready for collection. The apparatus is preferably of the kind which may be used either in a vacuum mode, to suck debris into the apparatus, or in a blowing mode, to discharge a stream of air so that debris can be blown into piles, ready for collection.

Known forms of apparatus of this kind, for example, that disclosed in U.S. Pat. No. 4,694,528, have a motor which is located in a housing and which drives a fan. An air inlet is provided in front of the fan and an air outlet is located radially of the fan. Differing arrangements of ducts are used to direct the air flow to provide the vacuum and blowing mode. In blowing mode, the output of the fan can be varied to provide a high blow or a low blow. A known system for controlling the strength of the blow which is disclosed in U.S. Pat. No. 4,694,528 does so by varying the input of air to the fan by having a rotating disc which is disposed in front of the inlet to the fan. The disc has holes in it, the size of which can be varied by rotation of the disc in order to vary the air blowing speed.

Such systems have the disadvantage of varying the load on the motor as the input to the fan varies and the fan speeds up or slows down.

BRIEF SUMMARY OF THE INVENTION

According to the present invention there is provided a debris blowing apparatus comprising:

a motor;

a fan driven by the motor;

an air inlet to the fan, an air outlet from the fan, a metering aperture through which air expelled from the outlet can be recirculated into the air inlet, an aperture cover for selectively covering the metering aperture, and a blower duct a first end of which communicates with the air outlet so that air which is not recirculated into the air inlet travels along the blower duct and exits from a second working end of the duct.

Preferably, the aperture cover is a sliding cover. The sliding cover may be operated by a rack and pinion arrangement.

The apparatus may include a suction duct, a first end of which communicates with the inlet to the fan when the apparatus is used in vacuum mode so that air is drawn into a second working end of the suction duct along the suction duct and through the fan. Debris is carried by the air flow into and along the suction duct and through the fan to a collection point. Alternatively, apparatus may include a suction duct the working end of which includes a means for generating an entrained air flow in the suction duct which means communicates with the outlet from the fan. The entrained airflow draws debris into the working end of the suction duct and transports along the suction duct to a collection point.

BRIEF DESCRIPTION OF THE DRAWINGS

Specific embodiments of the present invention are now described, by way of example only, with reference to the accompanying drawings, in which:

FIG. 4 is a cross-section of the debris collecting apparatus shown in FIG. 3 in vacuum mode.

DETAILED DESCRIPTION

Figure 1:
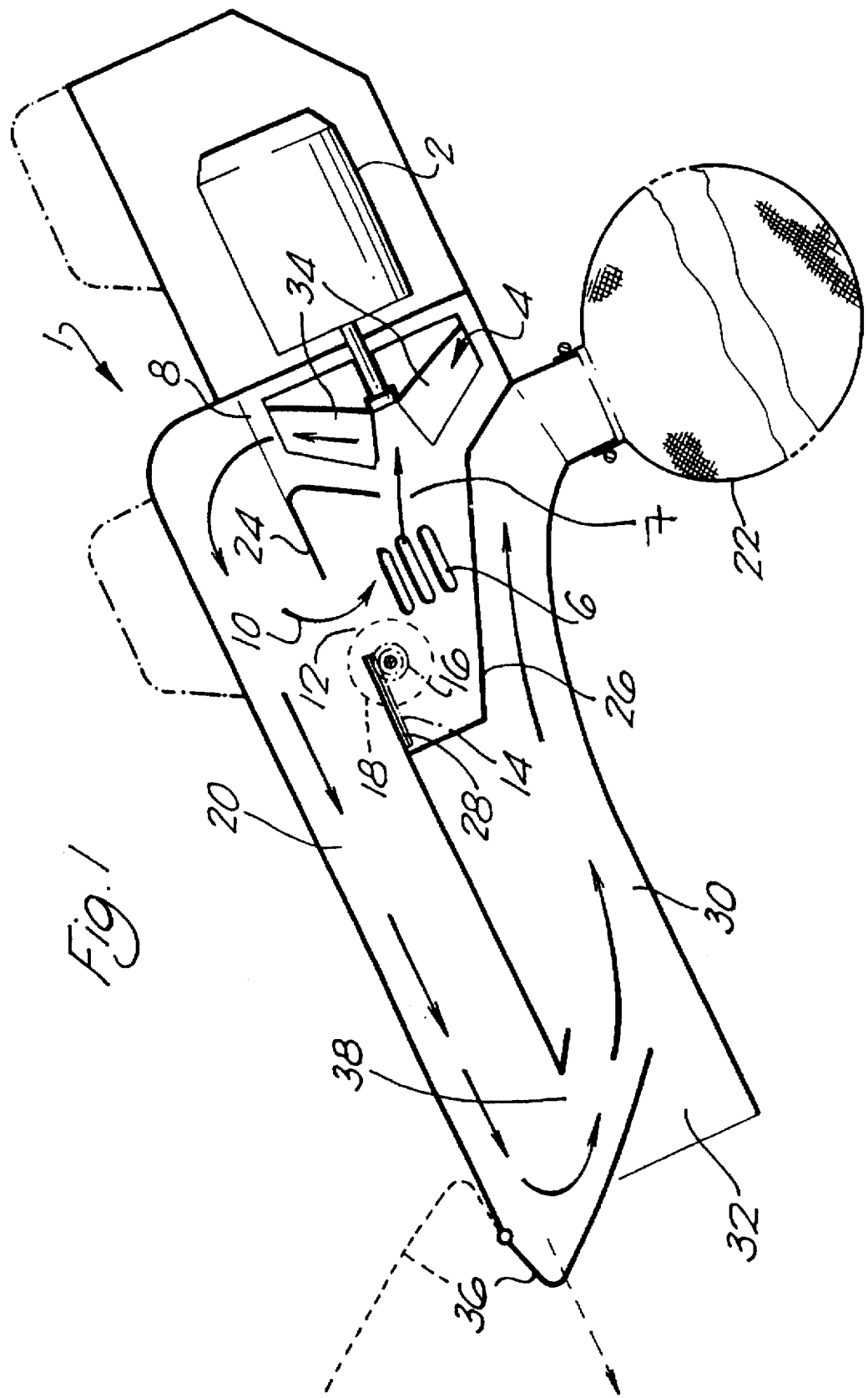
FIG. 1 is a cross-section of a debris collecting apparatus in accordance with a first embodiment of the present invention with the recycled air flow depicted by arrows.
Figure 2:
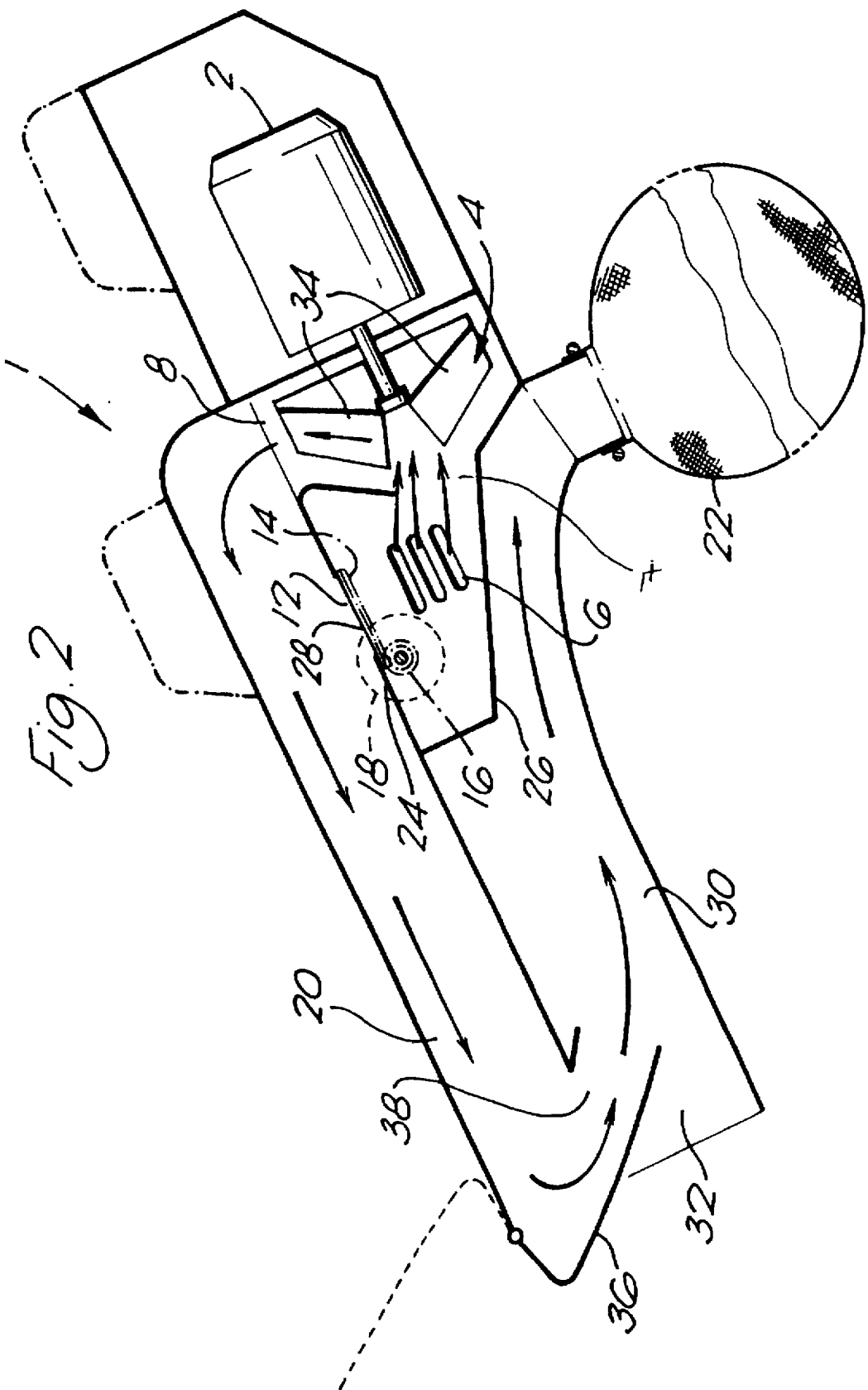
FIG. 2 is a cross-section of the debris collecting apparatus of FIG. 1 with no air recycling.

Referring to FIGS. 1 and 2, a debris collection apparatus 1 has a motor 2 which drives a fan 4. Air enters the apparatus 1 through a air vents 6 and is drawn into the fan 4 through an air inlet 7 in front of the fan 4. The air is expelled by the fan 4 radially and is directed through an air outlet 8.

The apparatus 1 has a blower duct 20 through which the air from the outlet 8 travels. The blower duct 20 has a flap 36 at an opening 38 at its working end. The flap 36 is pivotable between two positions. In a first position (shown in solid line in FIGS. 1 and 2) the air flow is directed from the opening 38 of the blower duct 20 back along a collecting duct 30 which runs parallel to the blower duct 20. A second position of the flap 36 (shown in broken lines in FIGS. 1 and 2) directs the air away from the collecting duct 30 and the apparatus 1 functions as a blower.

In the first position of the flap 36, the debris collecting apparatus is arranged in a vacuum mode. The air exiting through the outlet 8 from the fan 4 is directed by the blower duct 20 and the opening 38 at its working end. The flap 36 directs the exiting air back along a collecting duct 30 running parallel to the blower duct 20.

An opening 32 at the working end of the collecting duct 30, adjacent to the opening 38 of the blower duct 20, provides an inlet for the debris which is sucked into the collecting duct 30 by the air current exiting from the blower duct 20. The debris passes along the collecting duct 30 into a collecting sack 22. In this arrangement the debris does not pass through the fan 4.

In the second position of the flap 36 (shown in dotted lines) the debris collecting apparatus is arranged as a blower. Air is sucked into the fan 4 through the air inlet 7 via air vent 6 in an inlet housing 26 and is expelled through the air outlet 8 and out of the blower duct 20. Air which exits from the blower duct 20 (as shown by the dotted arrow in FIG. 1) is used to blow debris into a desired position for collecting.

An aperture 12 is provided in a wall 24 between the blower duct 20 and the inlet housing 26. The aperture 12 is metered by a sliding cover 28 operated by a knob 18 external to the housing 26. The knob 18 operates the cover 28 via a rack and pinion arrangement 14, 16. The toothed pinion 16 is rotated by the knob 18 causing the pinion 16 to interact with the rack 14 disposed on the sliding cover 28.

A variable portion of the air exiting through the blower duct 20 is recycled through the metering aperture 12 and re-enters the fan 4.

The amount of air 10 being recycled through the aperture 12 is varied by the operation of the knob 18. If a low blow is required with a low air output, the aperture 12 is opened to recycle the maximum amount of air possible through the aperture 12 so that less air travels down to the working end of the blower duct 20. The amount of air being drawn by the fan 4 through the air vents 6 is therefore reduced as there is less demand on the air vents. If a high blow is required, with a high air output, the aperture 12 is closed and all the air exiting from the fan 4 is directed to the working end of the blower duct 20. Thus, the amount of air drawn through the air vents 6 increases. As the size of the aperture 12 is varied the amount of air being drawn by the fan through the air vents 6 changes to compensate for the change in the volume of recirculated air. However, the total amount of air being drawn by the fan hardly changes so the load on the fan and thus the motor remains constant.

Figure 3:
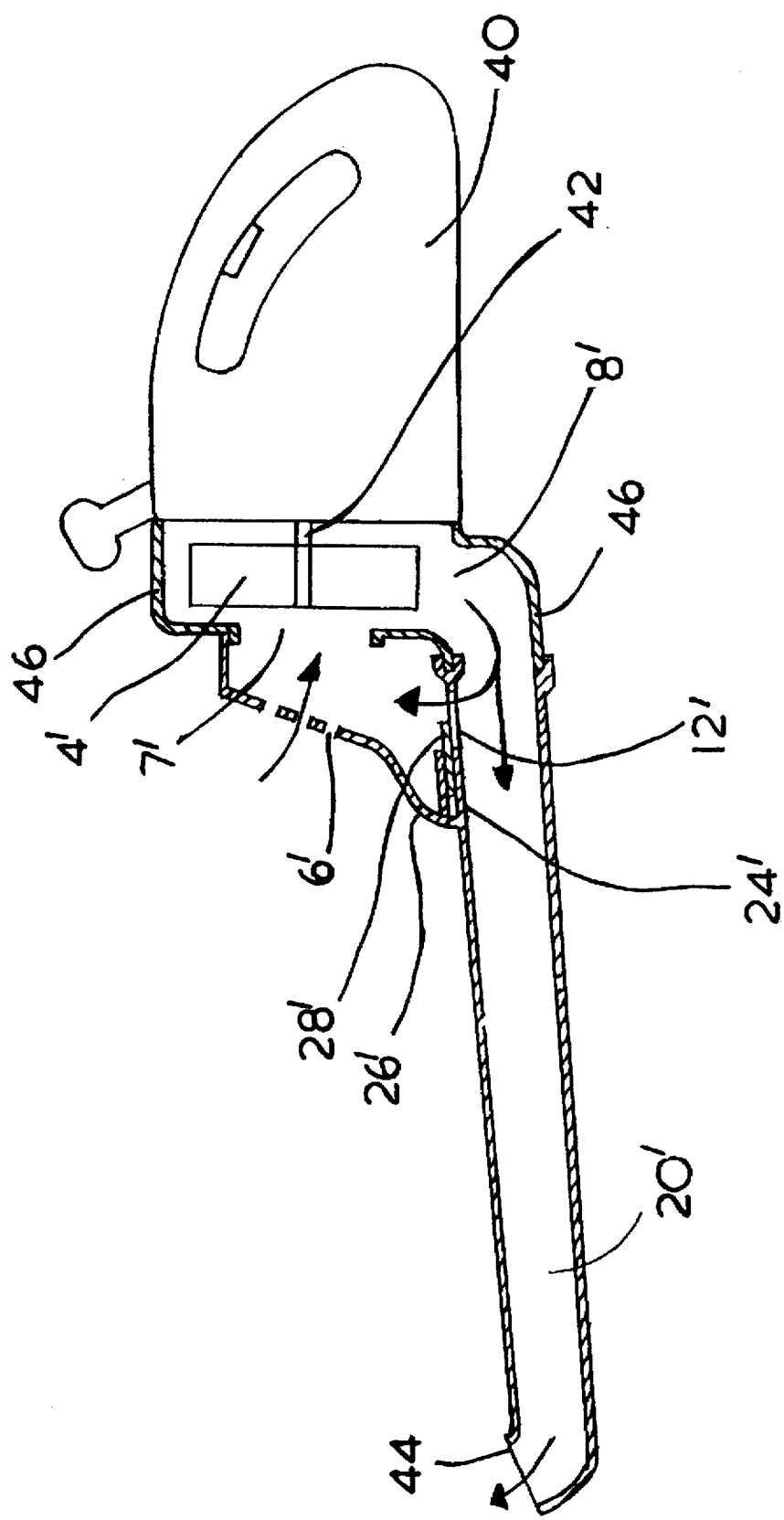
FIG. 3 is a cross-section of a debris collecting apparatus in accordance with a second embodiment of the present invention in blowing mode with the recycled airflow depicted by arrows.

A second type of debris collecting apparatus is shown in FIGS. 3 and 4. FIG. 3 shows the apparatus in blowing mode and FIG. 4 shows the apparatus in vacuum mode.

A housing 40 houses a motor (not shown) which drives a fan 4' via a drive shaft 42. The fan 4' draws air through the air vents 6' and air inlet 7' and expels air radially through air outlet 8' and blower duct 20'. Air exits the blower duct 20' at its working end 44 and can be used to blow debris into piles. The inlet housing 26' is formed integrally with the blower duct 20' to form a blower attachment. The metering aperture 12' and cover 28' are located on a wall 24' between the inlet housing 26' and the blower duct 20' and works in a similar way to that described in relation to FIGS. 1 and 2.

The blower attachment is releasably attachable to the motor fan housing 46 and can be replaced by a suction duct 30' and collecting bag 22' as shown in FIG. 4 when the apparatus is to be used in its vacuum mode.

In the vacuum mode air and entrained debris is drawn into the suction duct 30' at its working end 48. The air and debris is drawn through the fan 4' and expelled radially into the collecting bag 22'.

We claim:

1. A debris blowing apparatus comprising:
   a motor;
   a fan driven by the motor;
   an air inlet to the fan;
   an air outlet from the fan;
   a metering aperture through which air expelled from the outlet can be recirculated into the air inlet;
   an aperture cover for selectively covering the metering aperture;
   and a blower duct a first end of which communicates with the air outlet so that air which is not recirculated into the inlet travels along the blower duct and exits from a second working end of the duct.

2. A debris blowing apparatus according to claim 1, wherein the metering aperture has a sliding cover.

3. A debris blowing apparatus according to claim 2, wherein the sliding cover is operated by a rack and pinion arrangement.

4. A debris blowing apparatus according to claim 3, wherein a knob on the outside of the apparatus controls the aperture cover.

5. A debris blowing apparatus as claimed in claim 1, wherein the apparatus additionally comprises a suction duct a first end of which communicates with the inlet to the fan when the apparatus is used in vacuum mode so that air is drawn into the second working end of the suction duct along the suction duct and through the fan to a collection point.

6. A debris collecting apparatus according to claim 1, wherein the apparatus includes a suction duct which has a working end into which in use of the apparatus debris enters and said end includes a means for generating an entrained airflow in the suction duct which means communicates with the outlet from the fan.

* * * * *